United States Patent [19]

Ohgoda

[11] Patent Number: 5,025,156
[45] Date of Patent: Jun. 18, 1991

[54] RADIATION IMAGE READ-OUT APPARATUS

[75] Inventor: Makoto Ohgoda, Kanagawa, Japan

[73] Assignee: Fuji Photo Film Co., Ltd., Kanagawa, Japan

[21] Appl. No.: 462,183

[22] Filed: Jan. 8, 1990

Related U.S. Application Data

[63] Continuation-in-part of Ser. No. 246,483, Sep. 19, 1988, abandoned.

[30] Foreign Application Priority Data

Sep. 17, 1987 [JP] Japan .................................. 62-233423

[51] Int. Cl.$^5$ ............................................ G03B 42/00
[52] U.S. Cl. .................................. 250/327.2; 250/484.1
[58] Field of Search .................... 250/327.2 K, 327.2 J, 250/484.1 B

[56] References Cited

U.S. PATENT DOCUMENTS

| | | | |
|---|---|---|---|
| 4,258,264 | 3/1981 | Kotera et al. | 250/484.1 |
| 4,276,473 | 6/1981 | Kato et al. | 250/327.2 |
| 4,315,318 | 2/1982 | Kato et al. | 382/6 |
| 4,387,428 | 6/1983 | Ishida et al. | 364/413.13 |
| 4,527,060 | 7/1985 | Suzuki et al. | 250/327.2 |
| 4,771,174 | 9/1988 | Torii | 250/327.2 |
| 4,855,599 | 8/1989 | Ohgoda et al. | 250/327.2 |
| 4,861,995 | 8/1989 | Ohgoda | 250/327.2 |
| 4,864,134 | 9/1989 | Hosoi et al. | 250/327.2 |

FOREIGN PATENT DOCUMENTS

56-11395  2/1981  Japan .................................. 250/327.2

Primary Examiner—Constantine Hannaher
Attorney, Agent, or Firm—Sughrue, Mion, Zinn, Macpeak & Seas

[57] ABSTRACT

A radiation image read-out apparatus comprises a cassette holding section for releasably holding a cassette which houses a stimulable phosphor sheet carrying a radiation image stored thereon, and feeding out the stimulable phosphor sheet, a read-out section for reading out the radiation image stored on the stimulable phosphor sheet, and an erasing section for erasing radiation energy remaining on the stimulable phosphor sheet after the image read-out. A stacker accommodates a plurality of stimulable phosphor sheets and feeds out them one by one. A first conveyance system conveys the stimulable phosphor sheet fed out of the cassette holding section into the stacker, and conveys the stimulable phosphor sheet fed out of the stacker to the read-out section and the erasing section. A second conveyance system conveys the stimulable phosphor sheet passing through the erasing section into the stacker, and conveys the stimulable phosphor sheet taken out of the stacker into the cassette at the cassette holding section.

7 Claims, 3 Drawing Sheets

RADIATION IMAGE READ-OUT APPARATUS

This is a continuation-in-part application of application Ser. No. 07/246,483, filed Sep. 19, 1988, abandoned.

BACKGROUND OF THE INVENTION

1. Field of the Invention

This invention relates to a radiation image read-out apparatus for use in a radiation image recording and reproducing system. This invention particularly relates to a radiation image read-out apparatus which is made small by simplification of the mechanism in the apparatus.

2. Description of the Prior Art

When certain kinds of phosphors are exposed to a radiation such as X-rays, α-rays, β-rays, γ-rays, cathode rays or ultraviolet rays, they store a part of the energy of the radiation. Then, when the phosphor which has been exposed to the radiation is exposed to stimulating rays such as visible light, light is emitted by the phosphor in proportion to the stored energy of the radiation. A phosphor exhibiting such properties is referred to as a stimulable phosphor.

As disclosed in U.S. Pat. Nos. 4,258,264, 4,276,473, 4,315,318 and 4,387,428 and Japanese Unexamined Patent Publication No. 56(1981)-11395, it has been proposed to use a stimulable phosphor in a radiation image recording and reproducing system. Specifically, a sheet provided with a layer of the stimulable phosphor (hereinafter referred to as a stimulable phosphor sheet) is first exposed to a radiation passing through an object such as the human body to have a radiation image of the object stored thereon, and is then scanned with stimulating rays such as a laser beam which cause it to emit light in proportion to the stored radiation energy. The light emitted by the stimulable phosphor sheet upon stimulation thereof is photoelectrically detected and converted to electric image signals, and the radiation image of the object is reproduced as a visible image by use of the image signals on a recording material such as a photographic film, a display device such as a cathode ray tube (CRT), or the like.

In the aforesaid radiation image recording and reproducing system, the stimulable phosphor sheet is used to temporarily store a radiation image until the sheet is scanned with stimulating rays to read out the radiation image. Therefore, after the radiation image is read out from the stimulable phosphor sheet, radiation energy remaining thereon should be erased to reuse the sheet.

For satisfying this requirement, it has been proposed to provide a radiation image read-out apparatus with a read-out section for reading out an image stored on a stimulable phosphor sheet, and an erasing section for erasing radiation energy remaining on the sheet.

As such read-out apparatuses, there has been proposed an apparatus provided with the read-out section, the erasing section, and a cassette holding section for releasably holding a cassette which houses therein a single stimulable phosphor sheet carrying a radiation image stored thereon in the form housed in the cassette by use of an external image recording apparatus. In the proposed apparatus, the stimulable phosphor sheet is taken out of the cassette, sent to the read-out section and the erasing section for carrying out image read-out and erasing on the stimulable phosphor sheet, and then conveyed into the empty cassette at the cassette holding section. In the case where the stimulable phosphor sheet on which the image read-out and erasing have been finished is returned in this manner into the cassette in the read-out apparatus, a loader or the like for loading the cassette with the stimulable phosphor sheet outside of the read-out apparatus prior to the next image recording step becomes unnecessary. However, in this case, since the read-out apparatus is exclusively occupied by a single stimulable phosphor sheet until the sheet is housed in the cassette after image read-out and erasing are conducted on the sheet, processing of the next stimulable phosphor sheet cannot be started as long as processing of the preceding stimulable phosphor sheet is being carried out. Thus an unnecessarily long time is taken, and the processing capacity of the apparatus decreases markedly. Accordingly, in the radiation image read-out apparatus provided with the erasing section and constituted for loading the stimulable phosphor sheet into the cassette inside of the apparatus, it would be very advantageous if a stacker for temporarily housing the stimulable phosphor sheets therein and feeding out the housed sheets one by one could be provided in the sheet conveyance means present on the downstream side of the erasing section. In this case, exactly after the stimulable phosphor sheet has been taken out of the cassette, one of the erased reusable stimulable phosphor sheets can be fed out of the stacker and loaded into the cassette.

On the other hand, a stacker of the type as mentioned above should preferably be provided also between the cassette holding section and the read-out section. Specifically, a comparatively long time is taken for carrying out image read-out at the read-out section. Therefore, in the case where the stacker is provided on the upstream side of the read-out section, a plurality of image-recorded stimulable phosphor sheets can be accommodated in the stacker while the image read-out is being carried out for a single stimulable phosphor sheet at the read-out section, and it is possible to eliminate the problem that the image-recorded sheet is made to wait for a long time in the form housed in the cassette at the cassette holding section. Also, in the case where the stacker is provided, even though the read-out section becomes defective and inoperable, image recording in an external image recording apparatus need not be stopped immediately, but instead the image recording apparatus can be operated continuously for some period.

However, the aforesaid stacker for accommodating a plurality of the stimulable phosphor sheets is comparatively large. Therefore, in the case where two such stackers are provided in the apparatus, the apparatus becomes large.

SUMMARY OF THE INVENTION

The primary object of the present invention is to provide a radiation image read-out apparatus which is provided with a function of making wait image-recorded stimulable phosphor sheets and erased reusable stimulable phosphor sheets and which is small.

Another object of the present invention is to provide a radiation image read-out apparatus which is small and which enables efficient processing of stimulable phosphor sheets.

The present invention provides a radiation image read-out apparatus comprising:

i) a cassette holding section for releasably holding a cassette which houses therein a stimulable phosphor sheet carrying a radiation image stored thereon, and feeding said stimulable phosphor sheet out of said cassette, ii) a read-out section for carrying out radiation image read-out by scanning said stimulable phosphor sheet by a light beam which causes said stimulable phosphor sheet to emit light carrying said radiation image stored on said stimulable phosphor sheet, and detecting the emitted light, iii) an erasing section for erasing radiation energy remaining on said stimulable phosphor sheet after the radiation image read-out from said stimulable phosphor sheet is finished at said read-out section, iv) a stacker capable of accommodating therein N-number of stimulable phosphor sheets and feeding out said accommodated stimulable phosphor sheets one by one, v) a first sheet conveyance means for conveying the stimulable phosphor sheet fed out of said cassette holding section into said stacker, and conveying the stimulable phosphor sheet fed out of said stacker to said read-out section and said erasing section, vi) a second sheet conveyance means for conveying the stimulable phosphor sheet passing through said erasing section into said stacker, and conveying the stimulable phosphor sheet taken out of said stacker into the cassette at said cassette holding section, and vii) a control means for controlling the operation of said stacker and said first and second conveyance means so as to preset N-1 number of stimulable phosphor sheets which have been subjected to the erasing step in said stacker at the initial state, and to feed the stimulable phosphor sheet from the first cassette into said read-out section and feed one of the stimulable phosphor sheets out of the stacker into said first cassette, and to feed the stimulable phosphor sheet from the second and the subsequent cassettes into said stacker and feed one of the stimulable phosphor sheets out of the stacker into said second and the subsequent cassettes.

The first sheet conveyance means and the second sheet conveyance means need not necessarily be provided independently, and at least a part thereof may be utilized in common.

With the radiation image read-out apparatus in accordance with the present invention, the stacker is provided with the function of accommodating the image-recorded stimulable phosphor sheets and the function of accommodating the erased reusable stimulable phosphor sheets. Therefore, feeding of the stimulable phosphor sheet out of and into the cassette at the cassette holding section can be achieved efficiently by the provision of a single stacker in the apparatus, and the apparatus can be made smaller by simplification of the internal mechanism as compared with an apparatus provided with two stackers. Accordingly, processing of stimulable phosphor sheets can be carried out efficiently with a small apparatus.

DESCRIPTION OF THE PREFERRED EMBODIMENTS

The present invention will hereinbelow be described in further detail with reference to the accompanying drawings.

Figure 1:
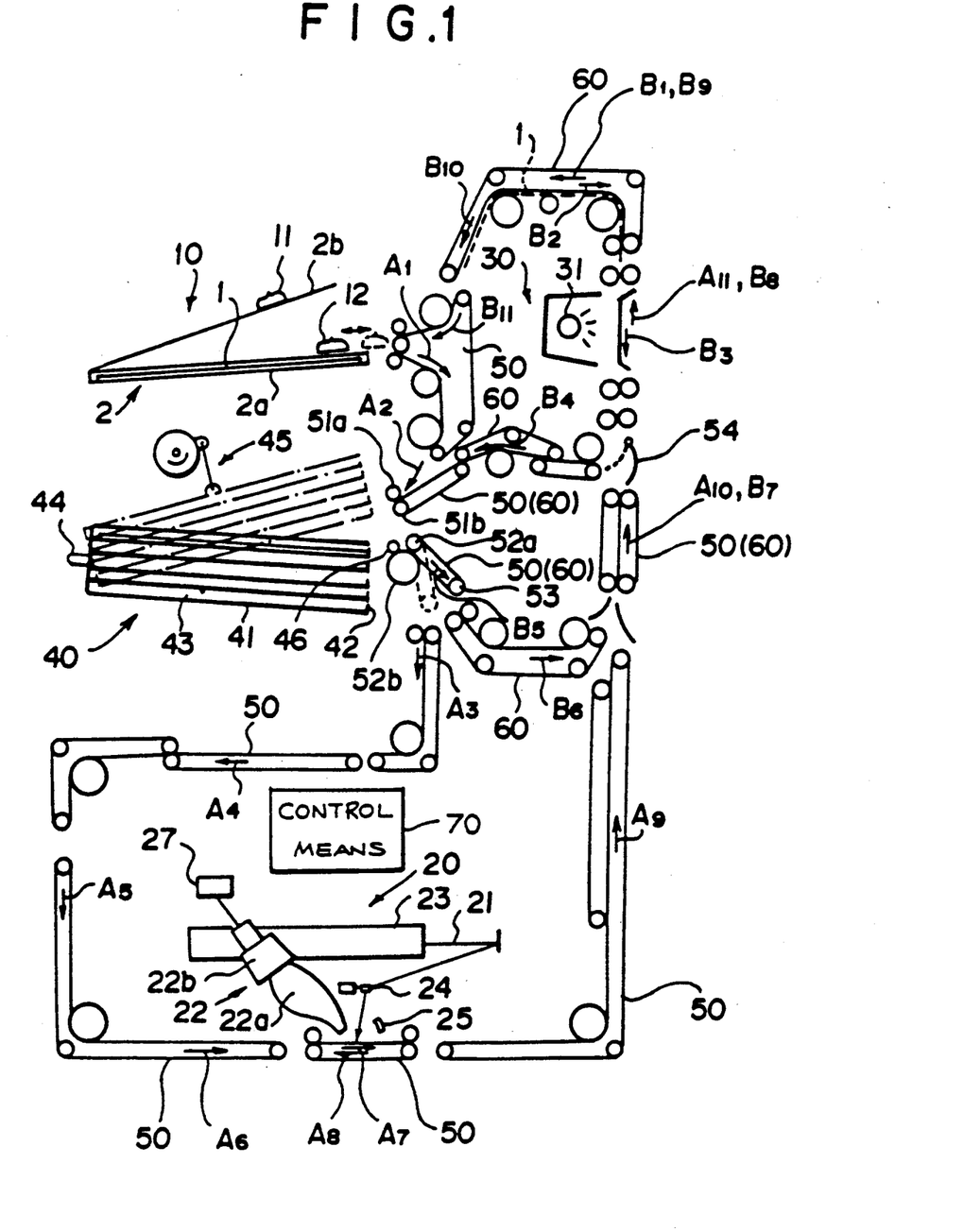
FIG. 1 is a schematic side view showing an embodiment of the radiation image read-out apparatus in accordance with the present invention.

With reference to FIG. 1, an embodiment of the radiation image read-out apparatus in accordance with the present invention is provided with a cassette holding section 10 for releasably holding a cassette 2 capable of housing a stimulable phosphor sheet 1 therein, a stacker 40 capable of accommodating therein a plurality of stimulable phosphor sheets 1, 1, . . . and feeding out the accommodated stimulable phosphor sheets 1, 1, . . . one by one, a read-out section 20 for reading out a radiation image stored on the stimulable phosphor sheet 1, and an erasing section 30 for erasing radiation energy remaining on the stimulable phosphor sheet 1 after image read-out therefrom is finished at the read-out section 20. Also, the apparatus is provided with a sheet conveyance means constituted by endless belts, rollers, guide plates and the like for conveying the stimulable phosphor sheet 1 among the cassette holding section 10, stacker 40, the read-out section 20 and the erasing section 30. Of the sheet conveyance means, the part for conveying the stimulable phosphor sheet 1 from the cassette holding section 10 to the stacker 40 and then to the read-out section 20 and the erasing section 30 constitutes a first sheet conveyance means 50, and the part for conveying the stimulable phosphor sheet 1 from the erasing section 30 into the stacker 40 and then conveying the stimulable phosphor sheet 1 taken out of the stacker 40 into the cassette 2 at the cassette holding section 10 constitutes a second sheet conveyance means 60. The first sheet conveyance means 50 and the second sheet conveyance means 60 are partially utilized in common.

The stimulable phosphor sheet 1 has been subjected to image recording in an external image recording apparatus (not shown) in the form housed in the cassette 2, and the cassette 2 housing the image-recorded stimulable phosphor sheet 1 is fed to the cassette holding section 10. The cassette 2 is light-tight so that the stimulable phosphor sheet 1 is prevented from exposure to external light when it is exposed to a radiation to have a radiation image recorded thereon. The cassette 2 comprises a cassette body 2a in which the stimulable phosphor sheet 7 is to be housed and an openable cover member 2b. When the cassette 2 is fed into the cassette holding section 10, the cover member 2b is maintained in the closed position. When the stimulable phosphor sheet 1 is to be taken out of the cassette 2 at the cassette holding section 10, the cover member 2b is opened as shown by a cover opening means 11 constituted by a suction cup or the like. After the cover member 2b is opened, a stimulable phosphor sheet take-out means 12 constituted by a suction cup or the like advances into the cassette 2, and sucks and takes the stimulable phosphor sheet 1 out of the cassette 2. The stimulable phosphor sheet take-out means 12 then transfers the stimulable phosphor sheet 1 to the first sheet conveyance means 50 in the vicinity of the cassette 2. The stimulable phosphor sheet 1 has been housed in the cassette 2 with its front surface provided with a stimulable phosphor layer facing down.

The stimulable phosphor sheet 1 taken out of the cassette 2 is conveyed by the first sheet conveyance means 50 in the directions as indicated by the arrows A1 and A2 into the stacker 40.

Figure 2:
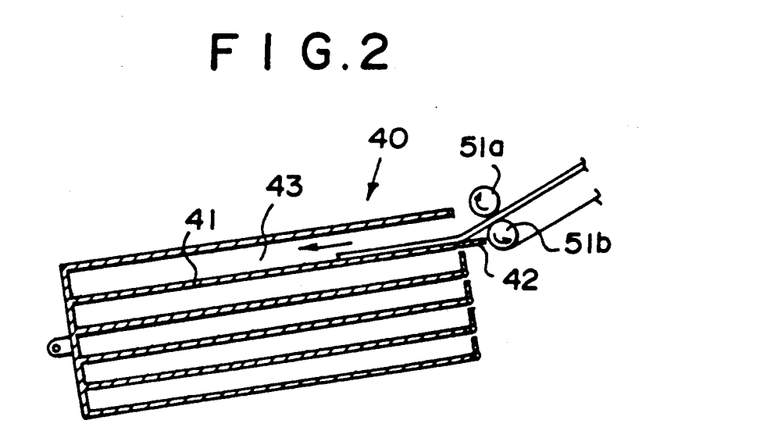
FIG. 2 is an explanatory schematic view showing the feeding of the stimulable phosphor sheet into the stacker.

As shown in FIGS. 1 and 2, the stacker 40 in this embodiment is provided with a plurality of partition plates 41, 41, , , , disposed in parallel, and sheet housing compartments 43, 43, . . . are formed by the partition plates 41, 41, . . . and side plates 42, 42, . . . provided at an edge on the side of the first sheet conveyance means 50. A single stimulable phosphor sheet 1 is housed in a single sheet housing compartment 43. Also, as shown in FIG. 1, the stacker 40 is rotatable by a link mechanism 45 around a support shaft 44 between a position as indicated by the solid line and a position as indicated by the chain line. The stacker 40 is moved so that an arbitrary one of the sheet housing compartments 43, 43, . . . faces feed-in rollers 51a and 51b of the first sheet conveyance means 50. As shown in FIG. 2, when a predetermined sheet housing compartment 43 into which the stimulable phosphor sheet 1 is to be fed has been moved to the position facing the feed-in rollers 51a and 51b, the side plate 42 of the sheet housing compartment 43 is brought down to the extension of the partition plate 41 to allow the stimulable phosphor sheet 1 to be fed by the feed-in rollers 51a and 51b into the sheet housing compartment 43. After the tailing edge of the stimulable phosphor sheet 1 leaves the feed-in rollers 51a and 51b, the stimulable phosphor sheet 1 falls by its weight into the sheet housing compartment 43 and is supported therein. Feeding of the stimulable phosphor sheet 1 out of the cassette 2 is repeated at the cassette holding section 10, and the stimulable phosphor sheets 1, 1, . . . thus fed out are sequentially conveyed into the stacker 40 and are made to wait in the stacker 40. In the case where the stimulable phosphor sheet 1 taken out of the cassette 2 is thus conveyed into the stacker 40 and made to wait therein, a new cassette 2 housing an image-recorded stimulable phosphor sheet 1 can be fed to the cassette holding section and the image-recorded stimulable phosphor sheet 1 can be taken out of the cassette 2 while the image read-out is being carried out for a preceding stimulable phosphor sheet 1 at the read-out section 20. Therefore, circulation of the stimulable phosphor sheets 1, 1, . . . can be carried out efficiently.

Figure 3:
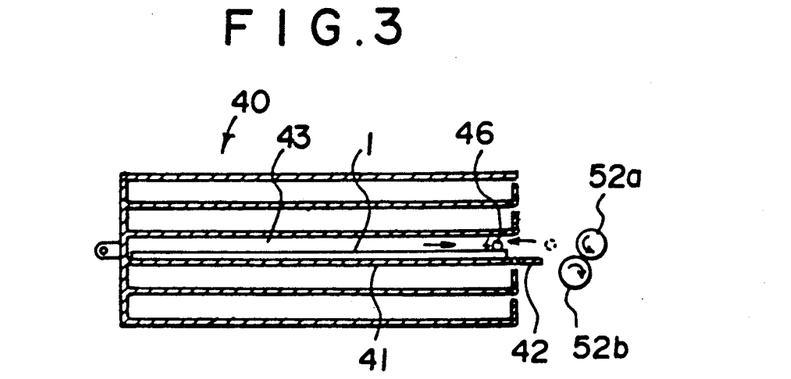
FIG. 3 is an explanatory schematic view showing the feeding of the stimulable phosphor sheet out of the stacker.

The stimulable phosphor sheet 1 is fed out of the stacker 40 and sent to the read-out section 20. Feed-out of the stimulable phosphor sheet 1 is carried out in the manner as described below. Specifically, feed-out rollers 52a and 52b are provided below the feed-in rollers 51a and 51b, and the stacker 40 is moved so that an arbitrary one of the sheet housing compartments 43, 43, . . . faces the feed-out rollers 52a and 52b. As shown in FIG. 3, at the time the stimulable phosphor sheet 1 is to be fed out of the stacker and the sheet housing compartment 43 housing the stimulable phosphor sheet 1 which is to be fed out is moved to face the feed-out rollers 52a and 52b, the side plate 42 of the sheet housing compartment 43 is brought down, and then a guide roller 46 which has been maintained at the position as indicated by the broken line is moved to the position as indicated by the solid line inside of the sheet housing compartment 43. The guide roller 46 pushes the stimulable phosphor sheet 1 against the partition plate 41, and is rotated to move the stimulable phosphor sheet 1 in the direction as indicated by the arrow. The edge portion of the stimulable phosphor sheet 1 thus moved is grasped between the feed-out rollers 52a and 52b. Then, as shown in FIG. 1, the stimulable phosphor sheet 1 is conveyed by the first sheet conveyance means 50 including the feed-out rollers 52a and 52b in the directions as indicated by the arrows A3, A4, A5 and A6 to the read-out section 20. As shown in FIG. 1, an endless belt 53 of the first sheet conveyance means 50 is moveable between the position as indicated by the solid line and the position as indicated by the broken line. At the time the image-recorded stimulable phosphor sheet 1 is conveyed out of the stacker 40 in the manner as mentioned above, the endless belt 53 is maintained at the position as indicated by the brokenline and guides the stimulable phosphor sheet 1 to the read-out section 20.

At the read-out section 20, the stimulable phosphor sheet 1 carrying a radiation image stored thereon is scanned by stimulating rays 21 such as a laser beam which cause the stimulable phosphor sheet 1 to emit light in proportion to the stored radiation energy, and the emitted light is photoelectrically detected by a photoelectric read-out means 22 constituted by a photomultiplier or the like to obtain electric image signals for use in reproduction of a visible image. Reference numeral 23 denotes a stimulating ray source, and reference number 24 denotes a light deflector such as a galvanometer mirror. Reference numeral 25 designates a reflection mirror for reflecting the light emitted by the stimulable phosphor sheet 1 towards a light guide member 22a of the photoelectric read-out means 22. The light guide member 22a guides the light through total reflection therein up to a photodetector 22b constituted by a photomultiplier or the like.

The stimulable phosphor sheet 1 sent to the read-out section 290 is conveyed by the first sheet conveyance means 50 in the direction as indicated by the arrow A7, and the overall surface of the stimulable phosphor sheet 1 is scanned two-dimensionally by the stimulating rays 21 deflected approximately normal to the direction of conveyance and is thus caused to emit light in proportion to the stored radiation energy. The light emitted by the stimulable phosphor sheet 1 in the course of the scanning is detected by the photodetector 22b via the light guide member 22a. The emitted light is converted by the photodetector 22b into electric image signals, and the electric signals thus obtained are sent to an image processing circuit 27 for carrying out image processing on the electric signals.

As for the radiation image read-out, there has heretofore been known a method wherein preliminary read-out for approximately ascertaining the radiation image stored on the stimulable phosphor sheet 1 is carried out prior to the aforesaid image read-out (final read-out) for obtaining electric image signals for use in reproduction a visible image, image read-out conditions for the final read-out or the like are adjusted based on the information obtained by the preliminary read-out, and the final read-out is carried out by use of the adjusted read-out conditions.

As disclosed in, for example, Japanese Unexamined patent Publication No. 58(1983)-67240, the preliminary read-out may be carried out by scanning the stimulable phosphor sheet 1 with stimulating rays having stimulation energy of a level lower than the level of the stimulation energy of the stimulating rays used in the final read-out, and detecting the light emitted by the stimulable phosphor sheet 1 in the course of the scanning by a photoelectric read-out means.

The read-out section 20 may be constituted to carry out only the final read-out or both the preliminary read-out and the final read-out. For example, the preliminary read-out may be carried out by conveying the stimulable phosphor sheet 1 in the direction as indicated by the arrow A7, the stimulable phosphor sheet 1 may then be switched back and reversely conveyed in the direction as indicated by the arrow A8 to the read-out start position, and then the final read-out may be carried out while the stimulable phosphor sheet 1 is again conveyed in the direction as indicated by the arrow A7. The optical members at the read-out section 20 are not limited to those as mentioned above. For example, as proposed in Japanese Unexamined Patent Publication No. 62(1987)-16666, a long photomultiplier may be disposed along the mains canning line as the photoelectric read-out means for detecting the light emitted by the stimulable phosphor sheet 1.

After the image read-out from the stimulable phosphor sheet 1 is finished at the read-out section 20, the stimulable phosphor sheet 1 is conveyed by the first sheet conveyance means 50 in the directions as indicated by the arrows A9 and A10 toward the erasing section 30. At this time, a sheet distributing means 54 provided in the conveyance path is maintained at the position as indicated buy the solid line and guides the stimulable phosphor sheet 1 upward.

At the erasing section 30, radiation energy remaining on the stimulable phosphor sheet 1 after the image read-out therefrom is finished is erased (i.e. released). Specifically, a part of the radiation energy stored on the stimulable phosphor sheet 1 at the image recording step remains stored thereon after the image read-out is carried out. In order to reuse the stimulable phosphor sheet 1, the residual radiation energy is erased at the erasing section 30. In this embodiment, the casing section 30 is provided with a plurality of erasing light sources 31, 31, . . . constituted by fluorescent lamps, tungsten-filament lamps, sodium lamps, xenon lamps, iodien lamps or the like, and the stimulable phosphor sheet 1 is exposed to the erasing light emitted by the casing light sources 31, 31, . . . for releasing the residual radiation energy form the stimulable phosphor sheet 1 while the stimulable phosphor sheet 1 is conveyed in the direction as indicated by the arrow A11. At the erasing section 30, any known erasing method may be used. For example, erasing may be conducted by heating or by a combination of exposure to the erasing light with heating.

The stimulable phosphor sheet 1 on which the erasing has been finished at the erasing section 30 is conveyed by the second sheet conveyance means 60 in the direction as indicated by the arrow B1 to the position as indicated by the broken line. The stimulable phosphor sheet 1 is then switched back and is reversely conveyed in the direction as indicated by the arrow B2. The stimulable phosphor sheet 1 is then conveyed in the direction as indicated by the arrow B3 through the erasing section 30, and conveyed in the direction as indicated by the arrow B4 by being guided by the sheet distributing means 54 which has been moved to the position as indicated by the broken line. Thereafter, the stimulable phosphor sheet 1 is conveyed by the feed-in rollers 51a and 51b into an empty sheet housing compartment 43 of the stacker 40. Before the stimulable phosphor sheet 1 is thus conveyed into the stacker 40, several erased reusable stimulable phosphor sheets 1, 1, . . . have already been accommodated in the stacker 40. Immediately after the image-recorded stimulable phosphor sheet 1 is taken out of the cassette 2 at the cassette holding section 10 in the manner as mentioned above, one of these erased reusable stimulable phosphor sheets 1, 1, . . . is taken out of the stacker 40 and sent into the empty cassette 2. In the case where the erased reusable stimulable phosphor sheets 1, 1, . . . are thus made to with in the stacker 40, a new stimulable phosphor sheet 1 can be conveyed into the empty cassette 2 within a short time interval after a cassette 2 housing an image-recorded stimulable phosphor sheet 1 is fed to the cassette holding section 10 and the image-recorded stimulable phosphor sheet 1 is taken out of the cassette 2. The cassette 2 loaded with the new stimulable phosphor sheet 1 can immediately be taken out of the cassette holding section 10 and can be sent to an external image recording apparatus for carrying out the image recording. In the case where the size of the stimulable phosphor sheet 1 held in the cassette 2 differs among the cassettes 2, 2, . . . , since the sheets 1, 1, . . . having different sizes may be held in advance in the stacker 40 and may be selectively fed out of the stacker 40 in accordance with the size of the cassette 2 fed to the cassette holding section 10, it is possible to circulate and reuse the stimulable phosphor sheets 1, 1, . . . efficiently regardless of the sheet sizes. In order to accommodate a plurality of the erased reusable stimulable phosphor sheets 1, 1, . . . in advance in the stacker 40, they may be collected into the stacker 40 without carrying out the sheet take-out therefrom for a while after the operation of the read-out apparatus is started, or unexposed stimulable phosphor sheets 1, 1, . . . may be loaded into the stacker 40 before the operation of the apparatus is started. As both the erased reusable stimulable phosphor sheets 1, 1, . . . and the image-recorded stimulable phosphor sheets 1, 1, . . . are accommodated in the stacker 40, in order to take out a desired stimulable phosphor sheet 1 from the stacker 40 in accordance with the purpose, it is necessary to use a control means for memorizing the kinds and conditions of the stimulable phosphor sheets 1, 1, . . . housed in the respective sheet housing compartments 43, 43, . . . of the stacker 40 and controlling the selection and taking-out of a desired stimulable phosphor sheet 1 in accordance with the purpose. For this purpose, the radiation image read-out apparatus is provided with a control means 70 disposed above the read-out section 20.

Take-out of the erased reusable stimulable phosphor sheet 1 from the stacker 40 is carried out in the same manner as the take-out of the image-recorded stimulable phosphor sheet 1, and the stimulable phosphor sheet 1 taken output of the stacker 04 is transferred to the feed-out rollers 52a and 52b. At the time the erased reusable stimulable phosphor sheet 1 is taken out of the stacker 40, the endless belt 53 is moved o the position as indicated by the solid line. The stimulable phosphor sheet 1 taken out of the stacker 40 is conveyed by the second sheet conveyance means 60 in the directions as indicated by the arrows B5, B6 and B7. The stimulable phosphor sheet 1 is then conveyed upward, passed through the erasing section 30 and again exposed to erasing light produced by the erasing light sources 31, 31, . . . since it may occur that the stimulable phosphor sheet 1 has bene maintained at the stacker 40 and a long time has elapsed after the stimulable phosphor sheet 1 was subjected to erasing at the erasing section 30. Specifically, when at least a predetermined time elapses after elapsing is conducted on the stimulable phosphor sheet 1, the sheet 1 stores energy of radiations emitted by radioactive isotopes such as Ra226 and K40, which are contained in a trace amount in the stimulable phosphor, or energy of environmental radiations such as cosmic rays and X-rays emitted by other X-ray sources. These types of radiation energy undesirably stored on the stimulable phosphor sheet 1 causes noise in a radiation image recorded next on the sheet 1. In order to prevent noise generation, the simulable phosphor sheet 1 is passed through the erasing section 30 in the direction as indicated by the arrow B8 for carrying out erasing (ile. secondary erasing) by releasing the radiation energy stored on the sheet 1 while the sheet 1 was being maintained in the stacker 40. The stimulable phosphor sheet 1 passing through the erasing section 30 is conveyed by the second sheet conveyance means 60 in the directions as indicated by the arrows B9, B10 and B11 into the cassette 2.

With this embodiment wherein both the image-recorded stimulable phosphor sheets 1, 1, . . . and the erased reusable stimulable phosphor sheets 1, 1, . . . are accommodated and made to wit in the single common stacker 40, the apparatus can be made simpler and smaller than in the case where two stackers are provided independently, and processing of the stimulable phosphor sheets 1, 1, . . . can be carried out efficiently without the overall apparatus being made large.

Figure 4:
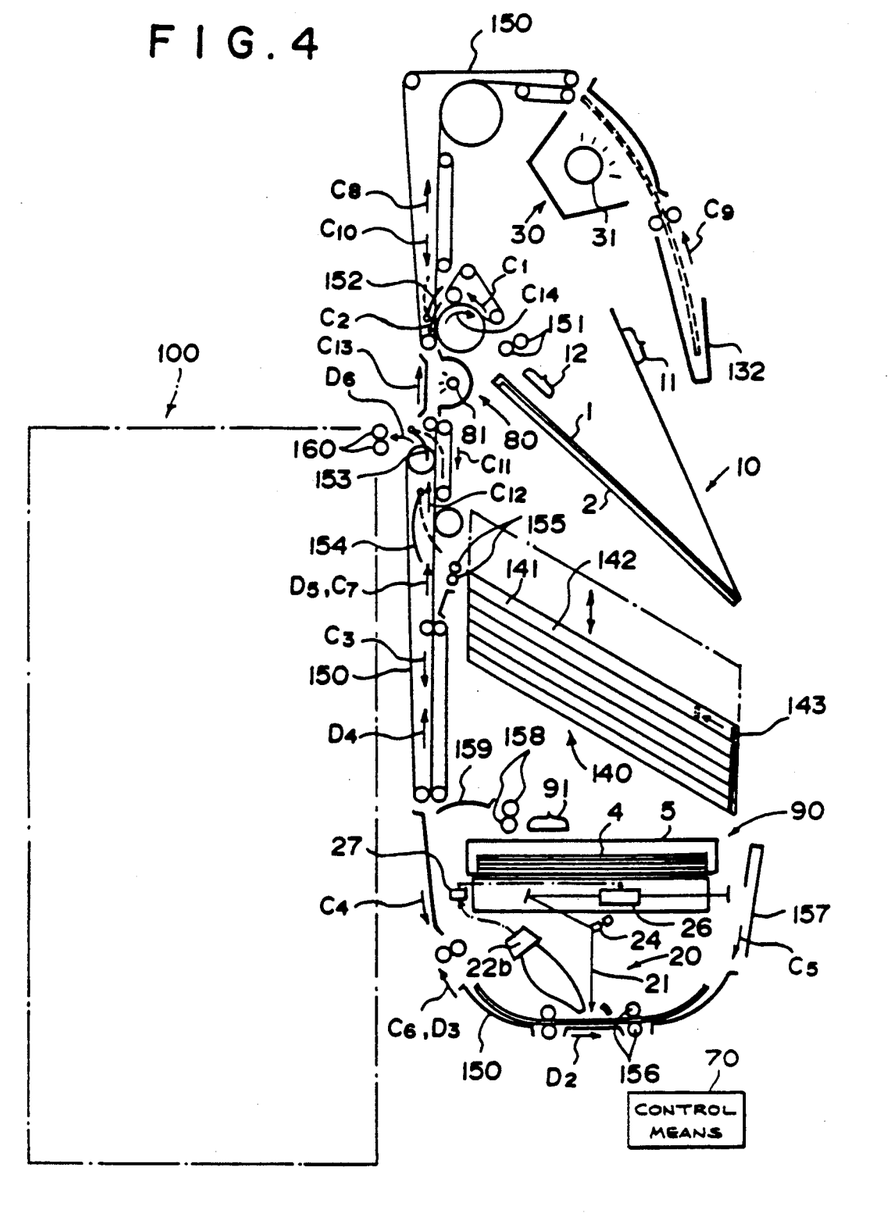
FIG. 4 is a schematic side view showing another embodiment of the radiation image read-out apparatus in accordance with the present invention.

On the other hand, the radiation image read out by the aforesaid read-out apparatus can be reproduced as a visible image recorded on a recording sheet by scanning the recording sheet with a light beam modulated in accordance with the radiation image. The reproducing apparatus for reproducing the radiation image into a visible image has heretofore been provided independently of the read-out apparatus. In recent years, there has arisen an increasing need for making the overall radiation image recording and reproducing system small. Therefore, the applicant proposed in, for example, Japanese Patent Application No. 62(1987)-5263, a read-out and reproducing apparatus wherein a radiation image read-out apparatus and a reproducing apparatus are combined integrally. The radiation image read-out apparatus in accordance with the present invention may be constituted as a read-out and reproducing apparatus a provided with a reproducing apparatus integrally. An embodiment of the radiation image read-out apparatus in accordance with the present invention integrally combined with a reproducing apparatus will hereinbelow be described with reference to FIG. 4. In FIG. 4, similar elements are numbered with the same reference numerals with respect to FIG. 1.

With reference to FIG. 4, the cassette holding section 10, the read-out section 20, the erasing section 30, and a stacker 140 are provided on above another. A sheet conveyance means 150 composed of a combination of the first sheet conveyance means with the second sheet conveyance means extends vertically in horizontal relation to the cassette holding section 10, the read-out section 20, the erasing section 30, and the stacker 140. The cassette holding section 10, the read-out section 20, the erasing section 30, and the stacker 140 are associated with the sheet conveyance means 150.

The stimulable phosphor sheet 1 taken out of the cassette 2 at the cassette holding section 10 is transferred to hip rollers 151, 151, conveyed by the sheet conveyance means 150 in the direction as indicated by the arrow C1, and then conveyed into the stacker 140 by being guided by sheet distributing means 152 and 153 maintained at the positions as indicated by the solid lines and by a sheet distributing means 154 maintained at the position as indicated by the broken line. A secondary erasing section 80 for carrying out secondary erasing by use of an erasing light source 81 is provided in the conveyance path for the stimulable phosphor sheet 1. At the time the stimulable phosphor sheet 1 taken out of the cassette holding section 10 is conveyed from above, the erasing light source 81 is turned off.

In this embodiment, the stacker 140 is provided with a plurality of stimulable phosphor sheet housing compartments 142, 142, . . . defined by partition plates 1541, 141, . . . , and is vertically moveable in the direction as indicated by the arrow between the position as indicated by the solid line and the position as indicated by the chain line, so that an arbitrary one of the sheet housing compartments 142, 142, . . . faces nip rollers 155, 155 provided in the vicinity of the stacker 140. The stimulable -phosphor sheet 1 is conveyed by the nip rollers 155, 155 into the sheet housing compartment 142 moved to the position facing the nip rollers 155, 155. After the tailing edge of the stimulable phosphor sheet 1 leaves the nip rollers 155, 155, the stimulable phosphor sheet 1 falls by its weight into the sheet housing compartment 142. The stimulable phosphor sheet 1 is held in the sheet housing compartment 1542 with the leading edge contacting a stopper 143 inside of the sheet housing compartment 142. At the time the stimulable phosphor sheet 1 is to be taken out of the stacker 140, the stacker 140 is moved until the sheet housing compartment 142 in which said stimulable phosphor sheet 1 is housed faces the in rollers 155, 155. Then, the stopper 143 is moved to the position as indicated by the broken line to push up the stimulable phosphor sheet 1. In this manner, the edge portion of the stimulable phosphor sheet 1 is grasped between the nip rollers 155, 155. The stimulable phosphor sheet 1 grasped by the nip rollers 155, 155 is guided by the sheet distributing means 154 at the position as indicated by the broken line, conveyed upward by the sheet conveyance means 150, and then conveyed in the directions as indicated by the arrows C3 and C4 into the read-out section 20. At this time, the stimulable phosphor sheet 1 taken out of the stacker 140 is once conveyed upward as mentioned above, so that the surface of the stimulable phosphor sheet 1 which is provided with the stimulable phosphor slayer and which faced down when the stimulable phosphor sheet 1 was housed in the cassette 2 faces up (i.e. the laser beam irradiation side) in the read-out section 20.

The image read-out at the rad-out section 20 is carried out in the same manner as in the aforesaid embodiment. A light modulator 26 which may be constituted by an acoustic-optic modulator (AOM) is maintained off at the time the laser beam 21 scans the stimulable phosphor sheet 1. After the image read-out from the overall surface of the stimulable phosphor sheet 1 is finished, the leading edge of the stimulable phosphor sheet 1 contacts a guide plate 157 with the tailing edge portion grasped between nip rollers 156, 156. The stimulable phosphor sheet 1 is then switched back and conveyed in the direction as indicated by the arrow C5.

The stimulable phosphor sheet 1 on which the image read-out has been finished is conveyed by the sheet conveyance means 150 in the directions as indicted by the arrows C6, C7 and C8 to the erasing section 30. At this time, the sheet distributing means 152 is moved to the position as indicated by he broken line, and the sheet distributing means 153 and 154 are at the positions as indicated by the solid lines.

At the erasing section 30, the stimulable phosphor sheet 1 is conveyed up to the position as indicated by the broken line along a guide plate 132, and is then conveyed reversely in the direction as indicated by the arrow C9. The stimulable phosphor sheet 1 on which the erasing has been finished is conveyed by the sheet conveyance means 150 in the directions as indicated by the arrows C10 and C11, and is conveyed into an empty sheet housing compartment 142 of the stacker 140 by being guided by the sheet distributing means 154 at the position as indicated by the broken line. At the time the erased stimulable phosphor sheet 1 is to be taken out of the stacker 140 and conveyed into the cassette 2 at the cassette holding section 10, the sheet distributing means 154 is maintained at the position as indicated by the broken line, the sheet distributing means 152 and 153 are moved to the positions as indicated by the solid lines, and the simulable phosphor sheet 1 is conveyed by the sheet conveyance means 150 in the directions as indicated by the arrows C12, C13 and C14 into the cassette 2. During this conveyance, the stimulable phosphor sheet 1 is passed through the secondary erasing section 80 and exposed to the light produced by the erasing light source 81, so that the radiation energy stored on the stimulable phosphor sheet 1 when it was accommodated in the stacker 140 is released.

On the other hand, the embodiment shown in FIG. 4 is constituted for carrying out reproducing of the read-out radiation image on a recording sheet as well as the aforesaid image read-out and erasing. Specifically, a recording sheet feeding section 90 for releasably holding a recording sheet feed magazine 5 which houses therein a plurality of recording sheets 4, 4, ... is provided above the read-out section 20. Also, the read-out section 20 acts in the same manner as an image reproducing section for reproduction of the radiation image. Reproduction of the radiation image in this embodiment will be described hereinbelow.

At the time the image read-out from the stimulable phosphor sheet 1 has been finished at the read-out section 20 and the stimulable phosphor sheet 1 has been conveyed out of the read-out section 20, a single recording sheet 4 is taken by a suction means 91 out of the recording sheet feed magazine 5 at the recording sheet feeding section 90, and transferred to nip rollers 158, 158 in the vicinity of the recording sheet feeding section 90. The recording sheet 4 is conveyed by the nip rollers 158, 158 along a guide plate 159 in the direction as indicated by the arrow D1, and is then conveyed by the sheet conveyance means 150 into the read-out section 20 in the same manner as the stimulable phosphor sheet 1. At the read-out section 20, the radiation image which was read from the stimulable phosphor sheet 1 in the manner as mentioned above is recorded on the recording sheet 4 while the recording sheet 4 is being conveyed by the sheet conveyance means 150 in the direction as indicated by the arrow D2.

At the time the recording sheet 4 is thus conveyed in the read-out section 20, the the light modulator 26 is operated in accordance with the image signals which were detected from the stimulable phosphor sheet 1, and the operation of the photodetector 22b is stopped. The recording sheet 4 is scanned by the laser beam 21 now acting as the recording light modulated by the light modulator 26 and deflected by the light deflector 24, so that the radiation image which was stored on the stimulable phosphor sheet 1 is reproduced over the overall surface of the recording sheet 4.

After the image reproduction on the recording sheet 4 is finished at the read-out section 20, the recording sheet 4 is conveyed by the sheet conveyance means 150 in the directions as indicated by the arrows D3, D4 and D5. At this time, the sheet distributing means 154 is maintained at the position as indicated by the solid line, and the sheet distributing means 153 is moved to the position as indicated by the broken line, thereby to guide the recording sheet 4 in the direction as indicated by the arrow D6 and to have the leading edge of the recording sheet 4 grasped between ejection rollers 160, 160. By way of example, the ejection rollers 160, 160 may convey the recording sheet 4 to an automatic developing section 100 connected to the read-out apparatus. Alternatively, a tray or the like may be positioned close to the ejection rollers 160, 160, and the recording sheets 4, 4, ... may be sequentially ejected into the tray or the like. Also, a holding section for the recording sheet housing tray may be provided inside of the read-out apparatus, and the recording sheets 4, 4, ... may be taken out of the apparatus in the form housed in the tray and sent to an external automatic developing machine.

At the read-out section 20, the reproduction of the radiation image read out from a single stimulable phosphor sheet 1 is carried out on a single recording sheet 4 immediately after the image read-out is carried out on the stimulable phosphor sheet 1. Instead, the image read-out may be carried out continuously for a plurality of the stimulable phosphor sheets at the read-out section 20, image signals thus detected may be stored in a memory, and then the image reproduction may be carried out continuously on a plurality of the recording sheets. Also, instead of reproducing all of the read-out radiation images as hard copies on the recording sheets, the radiation images may be displayed on a display device such as a CRT, and only the necessary images may be reproduced as hard copies on the recording sheets. Also, from the viewpoint of making the apparatus small and reducing the manufacture cost thereof, the read-out section 20 should preferably be formed integrally with the image reproducing section by utilizing the conveyance means and the laser beam scanning system in common in the manner as mentioned above. However, the image reproducing section may be formed beside the sheet conveyance means independently of the image read-out section.

As the recording sheet, a dry silver suitable for heat development or the like may be used as well as the ordinary silver halide photographic film. Also, besides the photosensitive recording materials, a heat-sensitive recording material may also be used. As the development process in the case where the silver halide photographic film is used, a wet development process, an instant process or the like may be used.

The aforesaid control means 70 employed in the apparatus of the first embodiment as shown in FIG. 1 is also employed in the apparatus according to the second embodiment as shown in FIG. 4.

The control means 70 controls the operation of the stacker 40 as follows. The stacker 40 is provided with N-number of compartments so that N-number of stimulable phosphor sheets 1 may be continuously put into the apparatus and handled thereby. At the initial stage, N-1 number of stimulable phosphor sheets 1 which have been subjected to the erasing process are put into the stacker 40. Then, while the apparatus is in the idling state, the first cassette 2 is put into the apparatus and the stimulable phosphor sheet 1 therein is fed to the read-out section 20 directly in the second embodiment as shown in FIG. 4 or by way of the stacker 40 in the first embodiment as shown in FIG. 1. Then, one of the stimulable phosphor sheets 1 in the stacker 40 which has already been subjected to the erasing process is put into the cassette 2. After the first cassette 2 loaded with the erased stimulable phosphor sheet 1 is removed from the apparatus, the second cassette 2 is put into the apparatus and the stimulable phosphor sheet 1 therein is fed to the stacker 40 and one of the stimulable phosphor sheets 1 in the stacker 40 which has already been subjected to the erasing process is put into the cassette 2. Then, the above steps are repeated.

In case where various sizes of stimulable phosphor sheets are used and a number of different sizes of cassettes are employed, at least one stacker 40 is employed for every size where each stacker should be provided with the desired number of compartments corresponding to said N-number. If the read-out section 20 is occupied by another size of the stimulable phosphor sheet when the first cassette of one size is put into the apparatus, the stimulable phosphor sheet in the cassette is fed into the stacker and one of the stimulable phosphor sheets in the stacker is put into the cassette.

When the size of the stimulable phosphor sheets is all the same, it is theoretically possible to handle N-number of sheets with only N−1 number of compartments. That is, after the second sheet is put into the stacker, the third cassette can wait for the first sheet finishing the erasing step and coming back to the stacker. However, in the practical use of the apparatus, if the apparatus stops while the first sheet is being fed therein due to power cut or the like, the sheet remaining in the apparatus cannot be properly located after the apparatus is recovered. Therefore, even in the case where the size of the stimulable phosphor sheets is all the same, it is desirable to provide N-number of in each stacker and preset N−1 number of compartments stimulable phosphor sheets in the stacker at the initial state.

I claim:

1. A radiation image read-out apparatus comprising:
   (i) a cassette holding section for releasably holding a cassette which houses therein a stimulable phosphor sheet carrying a radiation image stored thereon, and feeding said stimulable phosphor sheet out of said cassette,
   (ii) a read-out section for carrying out radiation image read-out by scanning said stimulable phosphor sheet by a light beam which causes said stimulable phosphor sheet to emit light carrying said radiation image stored on said stimulable phosphor sheet, and detecting the emitted light,
   (iii) an erasing section for erasing radiation energy remaining on said stimulable phosphor sheet after the radiation image read-out from said stimulable phosphor sheet is finished at said read-out section,
   (iv) a stacker capable of accommodating therein N-number of stimulable phosphor sheets and feeding out said accommodated stimulable phosphor sheets one by one,
   (v) a first sheet conveyance means for conveying the stimulable phosphor sheet fed out of said cassette holding section into said stacker, and conveying the stimulable phosphor sheet fed out of said stacker to said read-out section and said erasing section,
   (vi) a second sheet a conveyance means for conveying the stimulable phosphor sheet passing through said erasing section into said stacker, and conveying the stimulable phosphor sheet taken out of said stacker into the cassette at said cassette holding section, and
   (vii) a control means for controlling the operation of said stacker and said first and second conveyance means so as to preset N−1 number of stimulable phosphor sheets which have been subjected to the erasing step in said stacker at the initial state, and to feed the stimulable phosphor sheet for the first cassette into said read-out section and feed one of the stimulable phosphor sheets out of the stacker into said fist cassette, and to feed the stimulable phosphor sheet form the second and subsequent cassettes into said stacker and feed one of the stimulable phosphor sheets out of the stacker into said second and the subsequent cassettes wherein said cassette holding section, read-out section, erasing section, and stacker are connected to a single reciprocating sheet conveyance path.

2. An apparatus as defined in claim 1 wherein said read-out section is constituted for acting in the same manner as an image reproducing section for reproducing said radiation image as a visible image on a recording sheet.

3. An apparatus as defined in claim 1 wherein said light beam is a laser beam.

4. An apparatus as defined in claim 1 wherein said first sheet conveyance means and said second sheet conveyance means are at least partially utilized in common.

5. A radiation image read-out apparatus comprising:
   (i) a cassette holding section for releasably holding a cassette which houses therein a stimulable phosphor sheet carrying a radiation image stored thereon, and feeding said stimulable phosphor sheet out of said cassette,
   (ii) a read-out section for carrying out radiation image read-out by scanning said stimulable phosphor sheet by a light beam which causes said stimulable phosphor sheet to emit light carrying said radiation image stored on said stimulable phosphor sheet, and detecting the emitted light,
   f(iii) an erasing section for erasing radiation energy remaining on said stimulable phosphor sheet after the radiation image read-out from said stimulable phosphor sheet is finished at said read-out section,
   (iv) a stacker capable of accommodating therein N-number of stimulable phosphor sheets and feeding out said accommodated stimulable phosphor sheets one by one,
   (v) a first sheet conveyance means for conveying the stimulable phosphor sheet fed out of said cassette holding section into said stacker, and conveying the stimulable phosphor sheet fed out of said stacker to said read-out section and said erasing section,
   (vi) a second sheet conveyance means for conveying the stimulable phosphor sheet passing through said erasing section into said stacker, and conveying the stimulable phosphor sheet taken out of said stacker into the cassette at said cassette holding section, and
   (vii) a control means for controlling the operation of said stacker and said first and second conveyance means so as to preset N-31 1 number of stimulable phosphor sheets which have been subjected to the erasing step in said stacker at the initial state, and to feed the stimulable phosphor sheet from the first cassette into said read-out section and feed one of the stimulable phosphor sheets out of the stacker into said first cassette, and to feed the stimulable phosphor sheet from the second and subsequent cassettes into said stacker and feed one of the stimulable phosphor sheets out of the stacker into said second and the subsequent cassettes, wherein said stacker is angularly selectable into a first angular position corresponding to a feed-in position for feeding said stimulable phosphor sheets into said stacker, and into a second angular position different from said first angular position and corresponding to a feed-out position for feeding said stimulable phosphor sheets out of said stacker.

6. An apparatus as claimed in claim 5, wherein said first angular position of said stacker more specifically corresponds to any selected one of the plurality of feed-in positions, each of said feed-in positions being of feeding said stimulable phosphor sheets into a different one of a plurality of compartments of said stacker, and wherein said second angular position more specifically corresponds to any selected one of a plurality of feed-out positions, each of said feed-out positions being for feeding said stimulable phosphor sheets out of a different one of a plurality of compartments of said stacker.

7. A radiation image read-out apparatus comprising:
(i) a cassette holding section for releasably holding a cassette which houses therein a stimulable phosphor sheet carrying a radiation image stored thereon, and feeding said stimulable phosphor sheet out of said cassette,
(ii) a read-out section for carrying out radiation image read-out by scanning said stimulable phosphor sheet by a light beam which causes said stimulable phosphor sheet to emit light carrying said radiation image stored on said stimulable phosphor sheet, and detecting the emitted light,
(iii) an erasing section for erasing radiation energy remaining on said stimulbe phosphor sheet after the radiation image read-out from said stimulable phosphor sheet is finished at said read-out section,
(iv) a stacker capable of accommodating therein N-number of stimulable phosphor sheets and feeding out said accommodated stimulable phosphor sheets one by one,
(v) a first sheet conveyance means for conveying the stimulable phosphor sheet fed out of said cassette holding section into said stacker, and conveying the stimulable phosphor sheet fed out of said stacker to said read-out section and said erasing section,
(vi) a second sheet conveyance means for conveying the stimulable phosphor sheet passing through said erasing section into said stacker, and conveying the stimulable phosphor sheet taken out of said stacker through said erasing section without traversing through said read-out section and into the cassette at said cassette holding section, and
(vii) a control means for controlling the operation of said stacker and said first and second conveyance means so as to preset N−1 number of stimulable phosphor sheets which have been subjected to the erasing step in said stacker at the initial state, and to feed the stimulable phosphor sheet from the first cassette, into said read-out section and feed one of the stimulable phosphor sheets out of the stacker into said first cassette, and to feed the stimulable phosphor sheet form the second and subsequent cassettes into said stacker and feed one of the stimulable phosphor sheets out of the stacker into said second and the subsequent cassettes.

* * * * *